United States Patent Office 3,496,839
Patented Feb. 24, 1970

3,496,839
PROCESS FOR THE IRRADIATION TREATING OF UNSATURATED POLYESTER
Robert J. Hartle, Gibsonia, Pa., assignor to Gulf Research & Development Company, Pittsburgh, Pa., a corporation of Delaware
No Drawing. Filed May 18, 1967, Ser. No. 639,298
Int. Cl. C08f 1/16, 11/02
U.S. Cl. 204—159.19                          6 Claims

ABSTRACT OF THE DISCLOSURE

Unsaturated polyesters produced from 4,4'-stilbenedicarboxylic acid are irradiated with ultraviolet light to yield polyesters having improved properties such as increased tensile strength, increased solvent resistance and higher melting points.

BACKGROUND OF THE INVENTION

This invention relates to the irradiation of polymeric materials. More particularly, this invention relates to the irradiation of linear unsaturated polyesters produced from 4,4'-stilbenedicarboxylic acid with ultraviolet light and the improvements effected in the physical and chemical properties of such polyesters by such treatment. As used herein, the term "linear" refers to soluble and/or fusible polymers which are not substantially cross-linked between molecules but which can have branched chains in the polymer molecules. Such polymers are soluble in chlorinated hydrocarbons such as chloroform.

Polyesters containing unsaturated (double) bonds can be treated or cured with free radical initiating agents wherein the double bonds are attacked, thus initiating a chain reaction which leads to a cross-linked polyester. These chemically modified cross-linked polyesters usually exhibit higher solvent resistance, have higher melting and heat resistance points and have other improved mechanical properties such as increased tensile strength. Methods commonly employed to achieve these improved properties involve the addition of catalytic agents, such as organic peroxides, and/or the application of heat. Additionally, it is known in the art that properties such as solvent and heat resistance of saturated polyesters, i.e., those containing no double bonds, can be improved by exposing them to high energy radiation such as X-rays, gamma and beta rays. See for example U.S. Patent No. 2,951,024. However, methods which employ high energy radiation such as those described above are not suitable for treating polymers which contain a substantial degree of unsaturation such as the polyesters of the present invention. Rather, radiation such as X-rays, gamma and beta rays have a degrading effect on the physical properties of polymers characterized by a high degree of unsaturation. Properties of unsaturated polyesters have been modified by methods requiring the addition of a curing agent, such as a ketone, and thereafter exposing the polyester to ultraviolet light. See for example U.S. Patent No. 2,484,529. Methods employing various types of irradiation have distinct advantages over conventional methods used to cure unsaturated polyesters. For instance, reaction starts immediately when such materials are irradiated, lengthy induction periods involved in a catalyst-initiated cure are eliminated and temperature rises little during treatment, thereby allowing heat-sensitive substrates to be coated prior to treatment, without damage. It is therefore desirable to develop new methods for improving the properties of unsaturated polyesters eliminating the difficulties encountered in methods now known in the art.

SUMMARY OF THE INVENTION

I have discovered that properties such as melting point, tensile strength and solvent resistance of unsaturated polyesters produced from 4,4'-stilbenedicarboxylic acid can be improved by subjecting such polyesters to the action of actinic radiation having a wave length of from about 1000 A. to about 3900 A. preferably from about 1850 A. to about 3700 A., i.e., the range commonly referred to as the ultraviolet range. Any suitable source, such as a quartz mercury arc, carbon arc, impregnated carbon arc, or β-particle induced ultraviolet radiation can be used to supply the desired radiation. The unsaturated polyesters which are treated by the process of my invention can be characterized by the following general formula,

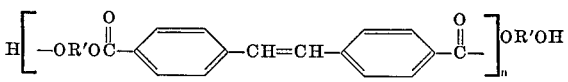

where R' is selected from the group consisting of alkylene, cycloalkylene and alkylene-oxy-alkylene radicals containing from 2 to 20 carbon atoms, preferably from 4 to 10 carbon atoms and $n$ can vary from 1 to 8000, preferably from 3 to 25. Examples of such groups are ethylene, propylene, trimethylene, 1,3-isobutylene, pentamethylene, neopentylene, 2,2-diethyl-1,3-propylene, hexamethylene, 2,2,4 - trimethyl-1,3-pentylene, 2-methyl-2,4-pentylene, decamethylene, 1,4-cyclohexylene, 1,4-cyclohexanedimethylene and ethyleneoxyethylene.

DESCRIPTION OF THE INVENTION

The unsaturated polyesters which are treated by the process of my invention can be prepared from well known and easily accessible materials. Thus, the acid component, 4,4'-stilbenedicarboxylic acid, can be obtained by methods such as those set forth in U.S. Patents 2,677,703 and 2,688,631. This diacid can be reacted with alkanediols to produce such polyesters. The alkanediols can be obtained from a variety of commercially available alkanediols. Examples of such compounds include ethylene glycol, propylene glycol, butylene glycol, 2,2-dimethyl-1,3-propanediol, 2-methyl-2-ethyl-1,3-propanediol, 2,2-diethyl-1,3-propanediol, 1,6-hexanediol, 1,10-decanediol, diethylene glycol, 1,4-cyclohexanediol, etc.

Any suitable method can be employed in preparing the polyesters of my invention. For example, the following procedures are particularly suitable in preparing the polyesters of my invention. These procedures involve reacting an ester of 4,4'-stilbenedicarboxylic acid with an alkanediol, such as defined above, for example, in an ester interchange reaction followed by polycondensation at high temperature and at a reduced partial pressure until a polymer of the desired molecular weight is produced. In carrying out the ester interchange reaction, at least one molecular proportion of the alkanediol per molecular proportion of the dicarboxylic ester is preferably used, but more desirably about 2 moles of the diol per mole of the ester. It is desirable to employ an ester of the dicarboxylic acid formed from an alcohol with a boiling point below that of the alkanediol so that the former can be removed easily from the reaction zone by distillation. It is preferred to use the methyl or ethyl esters, as these esters are formed from alcohols which, because of their relatively low boiling points, are easily separated by distillation from the alkanediol. Heating should be above the melting point of the mixture and above the boiling point of the alcohol to be displaced. Heating should be effected under conditions such that the displaced alcohol can be removed from the reaction zone, usually by means of conventional distillation equipment. The heating is usually at atmospheric pressure, but higher or lower pressures can be used if desired. The ester interchange reaction is advantageously carried out in the presence of ester interchange catalysts, such as manganese acetate, calcium acetate, litharge, sodium methoxide, tetrabutyl titanate, tetra-alkyl titanates such as tetra-isopropyl titanate, or other suitable ester interchange catalysts as described in the literature relating to the preparation of polyesters.

Following the ester interchange reaction, heating is continued under reduced pressure until the excess diol is removed and the polymerization has proceeded to the desired degree. This overall reaction sequence can be summarized by the following equations:

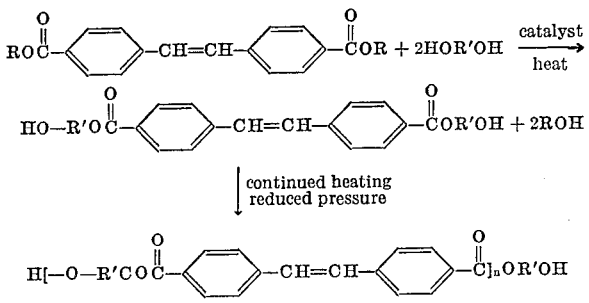

where R is an alkyl group and R' is selected from the group consisting of alkylene, cycloalkylene, and alkylene-oxyalkylene radicals, as defined above, and R is preferably a methyl or ethyl group and $n$ is an integer from one to 8000, preferably from 3 to 25.

The unsaturated polyesters prepared in this manner or by any other suitable prior art method are then subjected to ultraviolet radiation. In a preferred embodiment before irradiation the unsaturated polyesters are cast on a suitable surface to form films of varying thickness. The thickness of the films can range from about 0.1 mil (1 mil=.001 inch) to about 10 mils and preferably from about 0.5 mil to 5 mils. Upon exposure to radiation in the ultraviolet range the polyester films obtain increased tensile strength, higher melting points and increased solvent resistance and chemical corrosive resistance.

The following specific examples will further illustrate my invention.

Example I.—Solvent resistance and tensile strength

A polyester formed from 4,4'-stilbenedicarboxylic acid was prepared by mixing 10 grams of the dimethyl ester of 4,4'-stilbenedicarboxylic acid with 8.6 grams of neopentyl glycol (2,2-dimethyl-1,3-propanediol) and 0.03 gram of tetrabutyl titanate catalyst in a 50 milliliter flask equipped with an alembic type condenser and take-off. The apparatus was flushed with nitrogen and heated to 225° C. in a dibutyl phthalate bath. Methanol was slowly removed from the take-off. After three hours, at 215–225° C. (under nitrogen) the temperature was slowly increased to 285° C. while the pressure was reduced to about 1 millimeter. Nitrogen was bubbled through the mixture from a capillary tube during this time as neopentyl glycol was boiled out. The glycol collected on the surfaces of the condenser. The temperature was held at 280–285° C. and 1 millimeter vacuum maintained for three hours. 11.0 grams of the neopentylene polyester of 4,4'-stilbenedicarboxylic acid remained in the flask after cooling. It was a clear amber solid with deep-blue fluorescence and having a melt temperature of 160–170° C. The polyester was dissolved in hot chloroform and the solution filtered to remove traces of insoluble matter.

Films of the polyester were deposited on flat glass plates using a chloroform solution of the polyester (2–5 grams/100 milliliters). After evaporation of the solvent, the plates were placed six inches below a 450 watt Hanovia high-pressure mercury vapor lamp. Before exposure, the films were not strong enough to handle as a free film and became semi-fluid at 200° C. After exposure the films were characterized by a marked increase in tensile strength and higher melting temperature. Results of the ultraviolet treatment and subsequent determinations of solubility and tensile strength on two typical preparations (designated as A and B) are summarized in Table I.

TABLE I

| Polyester Batch[1] and Concentration | Film Thickness, mils | Irradiation Time, minutes | Tensile Strength, pounds per square inch (ASTM D882–61T) | Percent Elongation | Solvent Resistance |
|---|---|---|---|---|---|
| (A) 3 grams/100 milliliters of chloroform | 0.6 | 120 | 12,300 | 12 | No solubility in chloroform after 96 hours. |
|  | 0.8 | 120 | 9,000 | 8 |  |
|  | 1.2 | 120 | 9,520 | 15 |  |
|  | [2] 0.6–1.2 | 120 | 7,730 | 8 |  |
| (B) 2.7 grams/100 milliliters of chloroform | 0.7 | 30 | 6,250 | 6 | Not effected by benzene, acetone, ethanol, water, 1 N potassium hydroxide. |
|  | 0.8 | 65 | 5,450 | 7 |  |
|  | 0.7 | 120 | 2,850 | 5 |  |

[1] Reaction conditions:
 Batch A: 3 hours at 190–210° C., 3 hours at 290–300° C./3 millimeter.
 Batch B: 3 hours at 200–230° C., 3 hours at 270–295° C./1 millimeter.
[2] Average of 7 samples.

Example II.—Solvent resistance

The decrease in the solubility of the polyester films prepared by the methods of Example I was measured as a function of irradiation time. Films were cast onto tared microscopic slides from chloroform solution. The solvent was allowed to evaporate at room temperature followed by oven drying at 90° C. for two hours. The slides were weighed and suspended around the circumference of a laboratory ring support with the coated surface toward the center. An ultraviolet source was suspended at the center of the ring at a distance of six centimeters from the surface of the slides. After varying periods of exposure, the slides were removed and submerged in chloroform for one hour at room temperature. Undissolved film was recovered, washed with chloroform, dried and weighed. Film thickness was adjusted by changing the solution concentration and was determined by micrometer readings. Results of these determinations are summarized in Table II.

TABLE II.—SOLUBILITY OF IRRADIATED POLYESTER FILMS IN CHLOROFORM

| Polyester Sample [1] | Film Thickness, Mils | Irradiation Conditions [2] | | Weight Percent of Film Soluble in Chloroform (Average of 4 Slides) |
|---|---|---|---|---|
| | | Lamp Power, Watts | Time, Minutes | |
| 4 grams/100 milliliters of CHCl₃ | 0.6–0.8 | 450 | 60 | 6.0 |
| | 0.6–0.8 | 550 | 60 | 11.0 |
| | 0.6–0.8 | [3] 450 | 60 | 14.0 |
| | 0.6–0.8 | ([4]) | | 96.0 |
| 2.5 grams/100 milliliters of CHCl₃ | 0.2–0.3 | 450 | 5 | 14 |
| | 0.2–0.3 | 450 | 15 | 0 |
| | 0.2–0.3 | 450 | 30 | 0 |
| | 0.2–0.3 | 450 | 60 | 0 |
| | 0.2–0.3 | 450 | 120 | 19 |
| | 0.2–0.3 | ([4]) | | 84 |
| 8 grams/100 milliliters of CHCl₃ | 1.3–1.5 | 450 | 5 | [5] 98 |
| | 1.3–1.5 | 450 | 15 | [5] 58 |
| | 1.3–1.5 | 450 | 30 | [5] 33 |
| | 1.3–1.5 | 450 | 60 | [5] 28 |
| | 1.3–1.5 | ([4]) | | [5] 97 |

[1] Polyester prepared from dimethyl 4,4'-stilbenedicarboxylate and neopentyl glycol in accordance with procedures of Example I; 3 hours at 200–240° C., 3 hours at 290–300° C./1 millimeter.
[2] Slides suspended 6 centimeters from Hanovia high-pressure quartz mercury vapor lamp.
   450-watt (#679A)—total radiated energy=176 watts, greatest ultraviolet output from 313–336 millimicrons.
   550-watt (#673A)—total radiated energy=203 watts, greatest ultraviolet output from 313–336 millimicrons.
[3] With Vycor shield.
[4] No radiation.
[5] Average of 2 slides.

From the data contained in Table II, it will be seen that for very thin films (having thickness of 0.3 mil or less) 15 minutes of irradiation produced a film which is completely insoluble in chloroform. With respect to thicker films, a larger exposure time is required. It will also be seen from the data in Table II that exposure for too long a time tends to degrade the polymer.

Example III

Mixed polyesters of stilbenedicarboxylic acid and terephthalic acid were prepared by reacting the dimethyl esters of these two acids with neopentyl glycol. Reaction conditions and procedures were the same as those employed in Example I. Films of the resulting copolymers were then cast on flat glass plates and irradiated with ultraviolet light. The results of these determinations are summarized in Table III.

and solvent resistance of polymers, which are not otherwise affected by ultraviolet irradiation, can be obtained by incorporating relatively small proportions of diesters of 4,4'-stilbenedicarboxylic acid and irradiating them in accordance with my invention.

Example IV.—Heat stability

Films of the polyester prepared in accordance with the procedures of Example I were cast from a chloroform solution (2.7 grams/100 milliliters) onto 6 x 6 inch glass plates. The chloroform solvent was evaporated and the films were cured for 45 minutes under a 450 watt Hanovia high-pressure mercury lamp. Strips of the films were suspended in a tube furnace which was held at 600° F. for 24 hours, while a slow stream of air was passed through the tube. After 24 hours the films were darkened and embrittled by this treatment but did not tend to soften or lose their dimensional stability.

Polyesters treated by the process of my invention have several advantages. They can be used as protective coat-

TABLE III

| Co-Polyester, Mole Percent Charged | | | | | | | |
|---|---|---|---|---|---|---|---|
| Methylester of 4,4'-stilbenedicarboxylic Acid | Methylester of Terephthalic Acid | Mol Wt.[1] | Film Thickness [2] | Irradiation Time, [3] Minutes | Tensile Strength, pounds per square inch ASTM D882-61T | Percent Elongation | Solvent Resistance |
| 75 | 25 | 3,795 | 1.9 | 60 | 6,320 | 7 | Insoluble in chloroform. |
| 50 | 50 | 7,520 | 1.6 | 45 | 7,620 | 10 | Softened by chloroform and benzene, not affected by acetone, water, 1 N potassium hydroxide. |
| 50 | 50 | 7,520 | 1.4 | 120 | 7,450 | 10 | |
| 25 | 75 | 3,470 | 1.8 | 45 | 7,550 | 4 | |
| 0 | 100 | 4,700 | | 45 | ([4]) | | |

[1] Number average molecular weight determined by vapor pressure osmometry of non-irradiated polyester in chloroform.
[2] Films placed 6 inches below radiation source.
[3] Radiation source—450-watt, Hanovia high-pressure quartz mercury vapor lamp #679A, total radiated energy=176 watts, greatest ultraviolet output from 313–336 millimicrons.
[4] Weak and brittle.

From the data contained in Table III, it will be seen that mixed polyesters containing varying proportions of 4,4'-stilbenedicarboxylic acid units, when irradiated in accordance with the process of my invention, obtain properties similar to those of homopolymers of diesters of 4,4'-stilbenedicarboxylic acid. That is, tensile strengths of films prepared from mixed polyesters containing from 25 mole percent to 100 mole percent of the 4,4'-stilbenedicarboxylate component were all in the 6000 p.s.i. to 8000 p.s.i. range. However, films prepared from the terephthalate polyester alone were weak and brittle both before and after irradiation. Therefore, a substantial enhancement of physical properties such as tensile strength ings and are easily applied to a surface by spraying, dipping or painting. Furthermore, by employing the process of my invention, the need for the addition of separate catalytic curing agents is eliminated as well as the need for heat curing treatments. The polyester resins produced by my invention are especially useful in applications where heat and solvent resistance is critical, such as in the manufacture of electrical insulating varnishes.

A specific application of my invention can be illustrated by a typical preparation of a printing plate. In this application, a plate, usually of metal or a resilient sheet material, is formed wholly of or coated with a film of polyesters prepared from 4,4'-stilbenedicarboxylic acid.

The surface of the plate is then exposed to ultraviolet light through a contacted negative image composed of transparent and opaque areas on film or glass. The ultraviolet light produces an insoluble polyester in the areas of the surface beneath the transparent portion of the image, while the areas beneath the opaque portions of the image, being shielded from the light, remain soluble. The soluble areas of the surface are removed to a sufficient depth so that the insoluble, irradiated portions which remain can be used as a relief printing plate.

The polyesters can be used in other similar manners. A thin film can be used to form a relief image on a metal or other support. After irradiation with ultraviolet light, and removal of the soluble portion of the film, the base material can be etched with chemical etching agents such as acid or ferric chloride to form a relief image in the base material.

Example V.— Abrasion and impact resistance

Steel panels were dip-coated with a chloroform solution of the polyester prepared in Example I, and irradiated under a 450 watt Hanovia high-pressure mercury vapor lamp for 2.5 hours. Coating thickness on the panels was 1 mil. Abrasive and impact resistance of the coatings were determined using the Tabor Abrasion Test, ASTM C–501 and Falling Weight Impact Resistance Test. Similar determinations were made with steel panels coated with a commercially available epoxy coating. The results of these tests are summarized below in Table IV.

TABLE IV

|  | Irradiated Polyester Coating | Commercial Epoxy Coating |
| --- | --- | --- |
| Tabor Abrasion Test, ASTM C–501 CS–17 wheel, 1,000 g. weight, 50 cycles weight loss, g./1,000 cycles | 0.08 | 0.1–0.2 |
| Falling weight, Impact Resistance Test (inch-pounds) | >160 | ~50 |

It is to be understood that the above examples are illustrative only and are not intended as limiting the scope of my invention. Thus, there can be substituted in the foregoing examples other alkanediols to form other unsaturated polyesters with 4,4′-stilbendicarboxylic acid and other sources of irradiation can be employed, as previously discussed herein.

Obviously, many modifications and variations of the invention, as hereinabove set forth, can be made without departing from the spirit and scope thereof and therefore only such limitations should be imposed as are indicated in the appended claims.

I claim:

1. A process for producing a polyester resin composition having improved heat and solvent resistance and improved tensile strength, said polyester composition consisting of an unsaturated polyester having repeating units of the formula:

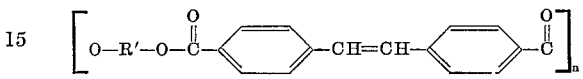

where R′ is an alkylene group and $n$ is an integer from 1 to 8000, which comprises subjecting said composition to electromagnetic radiation having a wave length of from about 1000 A. to 3900 A.

2. The process of claim 1 wherein R′ is a lower alkylene group.

3. The process of claim 1 wherein R′ is 2,2-dimethyl-1,3-propylene.

4. The process of claim 1 wherein said polyester composition is in the form of a film having a thickness of from about 0.1 mil to about 10 mils.

5. The process of claim 1 wherein said polyester composition is irradiated from about 1 minute to about 180 minutes.

6. The process of claim 1 where $n$ is an integer from 3 to 25.

References Cited

UNITED STATES PATENTS 2,484,529 10/1949 Roedel ———— 204—159.19
2,951,024 8/1960 D'Alelio ———— 204—159.19

MURRAY TILLMAN, Primary Examiner

R. B. TURER, Assistant Examiner

U.S. Cl. X.R.

204—159.14, 159.22; 260—75, 861